United States Patent [19]

Vissers et al.

[11] 4,086,404

[45] Apr. 25, 1978

[54] ELECTRODE INCLUDING POROUS PARTICLES WITH EMBEDDED ACTIVE MATERIAL FOR USE IN A SECONDARY ELECTROCHEMICAL CELL

[75] Inventors: Donald R. Vissers, Naperville; Paul A. Nelson, Wheaton; Thomas D. Kaun, Lisle; Zygmunt Tomczuk, Palos Hills, all of Ill.

[73] Assignee: The United States of America as represented by the United States Department of Energy, Washington, D.C.

[21] Appl. No.: 785,639

[22] Filed: Apr. 7, 1977

Related U.S. Application Data

[62] Division of Ser. No. 652,696, Jan. 27, 1976, Pat. No. 4,048,715.

[51] Int. Cl.² ............................................. H01M 4/36
[52] U.S. Cl. .................................. 429/220; 429/221; 429/223
[58] Field of Search ............... 429/220, 221, 223, 218, 429/27, 42; 252/182.1, 518, 519, 506

[56] References Cited

U.S. PATENT DOCUMENTS

| | | | |
|---|---|---|---|
| 3,796,604 | 3/1974 | Gabano et al. | 429/220 X |
| 3,933,520 | 1/1976 | Gay et al. | 429/221 X |
| 4,011,374 | 3/1977 | Kaun | 429/220 |

Primary Examiner—Charles F. LeFevour
Attorney, Agent, or Firm—Dean E. Carlson; Frank H. Jackson; Hugh W. Glenn

[57] ABSTRACT

Particles of carbonaceous matrices containing embedded electrode active material are prepared for vibratory loading within a porous electrically conductive substrate. In preparing the particles, active materials such as metal chalcogenides, solid alloys of alkali or alkaline earth metals along with other metals and their oxides in powdered or particulate form are blended with a thermosetting resin and particles of a volatile to form a paste mixture. The paste is heated to a temperature at which the volatile transforms into vapor to impart porosity at about the same time as the resin begins to cure into a rigid, solid structure. The solid structure is then comminuted into porous, carbonaceous particles with the embedded active material.

6 Claims, 1 Drawing Figure

U.S. Patent       April 25, 1978       4,086,404
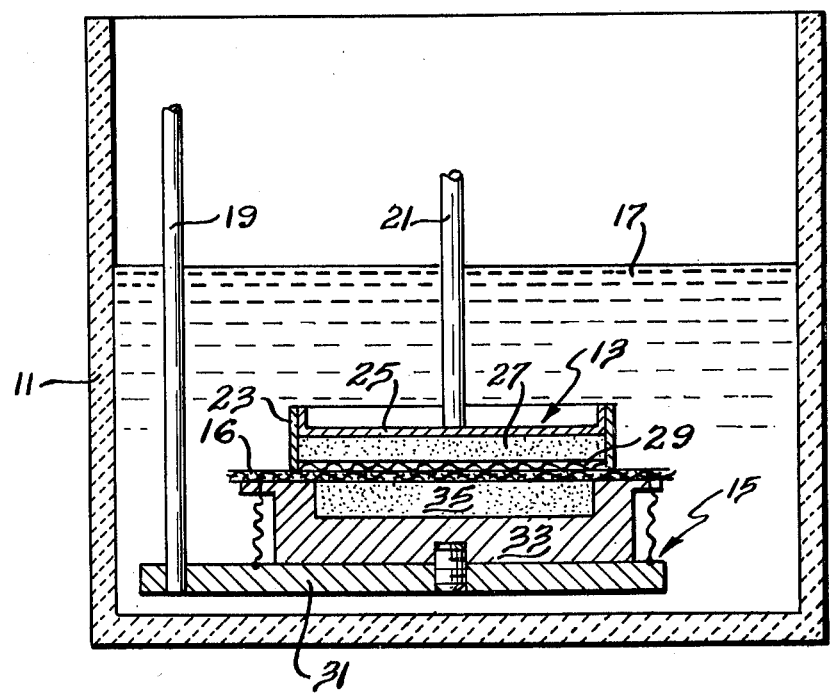

ELECTRODE INCLUDING POROUS PARTICLES WITH EMBEDDED ACTIVE MATERIAL FOR USE IN A SECONDARY ELECTROCHEMICAL CELL

This is a division of application Ser. No. 652,696, filed Jan. 27, 1976 now U.S. Pat. No. 4,048,715.

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to the preparation of both positive and negative electrodes for use in high-energy secondary electrochemical cells and batteries that can be employed as power sources for electric automobiles and for the storage of electric energy generated during intervals of off-peak power consumption. A substantial amount of work has been done in the development of such electrochemical cells and their electrodes. The cells showing the most promise employ alkali metals, alkaline earth metals and alloys of these materials as negative electrodes opposed to positive electrodes including the chalcogens and metal chalcogenides as active materials. Typical examples include lithium, sodium or calcium and alloys of these active materials with more stable elements such as aluminum and silicon as the negative electrode materials. In the positive electrode, active materials advantageously include metal sulfides and mixtures of metal sulfides such as the iron sulfides, cobalt sulfides, copper sulfides, nickel sulfides, and molbydenum sulfides.

Examples of such secondary cells and their components are disclosed in U.S. Pat. No. 3,907,589 to Gay et al., entitled "Cathodes for a Secondary Electrochemical Cell" and in allowed U.S. Pat. No. 3,947,291, Mar. 30, 1976 to Yao et al., entitled "Electrochemical Cell Assembled in Discharged State"; U.S. Pat. No. 3,933,521, Jan. 20, 1976 to Vissers et al., entitled "Improved Anode for a Secondary High-Temperature Electrochemical Cell", U.S. Pat. No. 3,941,612, Mar. 2, 1976 to Steunenberg et al., entitled "Improved Cathode Composition for Electrochemical cell"; U.S. Pat. No. 3,933,520, Jan. 20, 1976 to Gay et al., entitled "Method of Preparing Electrodes with Porous Current Collector Structures and Solid Reactants for Secondary Electrochemical Cells". Each of these patents and patent applications is assigned to the assignee of the present application. In addition to these high-temperature cells, the present invention is also applicable to the more conventional lead-acid and nickel-cadmium cells.

Prior electrodes have been prepared by various techniques and many have performed reasonably well. A number of problems still exist respecting long-life electrodes having sufficiently high specific energy and specific power for such as vehicular application. Active materials in solid rather than liquid form have been selected to enhance retention and cell life. However, the uniform distribution of active material within current collector structures without drifting during operation continues to be of concern.

In other electrodes, paste mixtures of molten-salt electrolyte and particulate active material have been pressed into electrically conductive metal screens, mesh or other lattice structures. These type electrodes are tedious to prepare, as they require elevated temperatures over extended periods of time during the pressing operation. Also, it has been difficult to form a uniform electrode with hot pressing techniques.

In other electrodes, particular active material has been vibrated into a porous electrically conductive current collector structure. In this method, the particle sizes and substrate interstices must be appropriately matched to obtain adequate loading and to prevent slumping of the material within the substrate. Such a vibratory loading technique can present problems where the active material undergoes substantial volumetric changes between the condition in which it is loaded and the conditions it attains during cycling. This, for example, occurs when iron sulfides react to form lithium sulfide.

One technique for obtaining uniform loadings of active material of about 30 to 40 percent of theoretical is to melt molten-salt electrolyte with the active material, e.g. FeS or $FeS_2$ particles, solidify and then regrind to obtain suitable material. Although such material can be loaded uniformly by vibrating methods into a porous substrate, the active material may well slump during cell operation when the electrolyte again becomes molten.

SUMMARY OF THE INVENTION

Therefore, in view of these problems that have occurred in the preparation of previous electrodes, it is an object of the present invention to provide an improved method of preparing active electrode material for loading into porous electrically conductive substrates.

It is a further object to provide particles of electrode material that can be uniformly loaded and maintained within porous electrically conductive substrates while leaving sufficient void volume for volumetric changes during cycling of the cell.

It is also an object to provide an improved electrode including a porous electrically conductive substrate with active material uniformly distributed within its void volume.

In accordance with the present invention, an electrode for use in a secondary electrochemical cell is prepared by blending thermosetting carbonaceous material with particulate active material and solid volatile to form a uniform paste. The paste is heated to a temperature sufficient to transform the volatile to vapor and to cure the thermosetting material into a solid porous matrix. The matrix is comminuted into carbonaceous particles with embedded active material. These particles are then vibratorily loaded into a porous electrically conductive substrate that can be employed as an electrode within the electrochemical cell.

The invention also comprehends porous cabonaceous particles having solid and yet smaller particles of active material embedded within. In addition, an electrode structure is provided in which such porous carbonaceous particles are distributed within the void volume of a porous electrically conductive substrate.

Examples of contemplated active materials in the positive electrodes include the chalcogenides, i.e. the oxides, sulfides and selenides of metals such as iron, cobalt, nickel, copper, lead, zinc, antimony, and manganese. In the negative electrode, examples of active materials include solid alloys of lithium, calcium or possibly sodium with such relatively inert elements as aluminum or magnesium. Also metals that remain solid at the cell operating temperature, e.g. lead in a lead-sulfuric acid battery can be employed. It is also to be understood that an electrode provided in accordance with the present invention can be used within an electrochemical cell opposite to a conventional electrode.

Suitable thermosetting materials are those that can be provided as liquid or moldable substance while in a monomer or partially polymerized form. On heating, these thermosetting materials become more completely polymerized, that is cured, to provide a solid carbonaceous matrix. Many of the phenolic, epoxy and furfuryl resins can be used as the thermosetting material.

The solid volatiles blended into the paste mixture include both inorganic and organic materials that will transform, that is decompose or sublime, directly from solid to vapor or impart porosity to the resin as it cures. Various carbonates, bicarbonates and organic compounds have been found to be suitable for this application. In a somewhat altered procedure, volatiles with higher transformation temperatures can be selected if carburization or graphitization of the matrix is to be performed.

BRIEF DESCRIPTION OF THE DRAWINGS

The present invention is illustrated in the accompanying drawing wherein:

The drawing is a generally schematic view in vertical cross section of a typical electrochemical cell used in testing electrodes.

DETAILED DESCRIPTION OF THE PREFERRED EMBODIMENT

In the drawing, an electrochemical cell is shown contained within a ceramic crucible 11. The cell includes a negative electrode 13 and a positive electrode 15 submerged within a molten salt electrolyte 17. Electrical conductors 19 and 21 extend from the positive and negative electrodes, respectively, for connection to electrical instrumentation for evaluating the cell. An interelectrode separator 16 of electronically insulative material separates the positive and negative electrodes while permitting ionic current flow during operation of the cell. The cell is illustrated merely typifies the type cell employed in demonstrating the improved electrodes of the present invention. It will be clear that various other cell types, for instance as illustrated in the patent applications cited in the Background of the Invention, can incorporate the improved electrodes described herein.

The negative electrode 13 is shown held within a metal support ring 23 with cover 25 and electrical communication with conductor 21. A retainer screen 29 covers the lower surface of the electrode. The electrode active material is contained within a porous substrate 27, as will be described below.

The positive electrode 15 is made up of an electrically conductive and chemically inert base structure 31 that supports and makes electrical contact between conductor 19 and the electrode cup 33. Cup 33 as illustrated can be a porous electrically conductive material such as of graphite to hold and support the porous substrate 35 containing the electrode active material.

The electrolytes 17 that surrounds and permeates into the two electrodes can be a eutectic or other molten salt composition. Electrolytes such as the eutectic compositions of LiCl-KCl, LiCl-LiF-KCl and LiF-LiCl-LiI can be used. Various other suitable electrolytic salts can be selected from those listed in U.S. Pat. No. 3,716,409 to Cairns et al., entitled "Cathodes for Secondary Electrochemical Power-Reducing Cells."

In preparing the electrodes, a paste composition is initially formed in essentially the same manner as is described in U.S. Pat. No. 4,011374, Mar. 8, 1977 to Kaun entitled "Porous Carbonaceous Electrode Structue and Method for Secondary Electrochemical Cell". The paste includes a thermosetting carbonaceous material, particles of the electrode active material and particles of a volatile substance. The paste is formed into the desired configuration and heated to the curing temperature of the thermosetting carbonaceous material and the sublimination or decomposition temperature of the volatile substance. As the volatile sublimates or decomposes to vapors, porosity is imparted to the carbonaceous material as it solidifies into a solid structure.

The solid structure is then comminuted into porous carbonaceous particles of substantially larger particle sizes than that of the active material. As an example, particle sizes of the porous carbonaceous material with embedded active material should range from about 2 to 10 times that of the particulate active material. The porous carbonaceous particles are then uniformly spread over the exposed surface of a porous, electrically conductive substrate and the substrate is vibrated at an effective frequency and amplitude for a sufficient period of time to uniformly load the particles into the interstitial openings. The procedure for loading these electrically conductive, pore substrates is completely described in U.S. Pat. No. 3,933,520, Jan. 20, 1976 to Gay and Martino, entitled "Method of Preparing Electrodes with Porous Current Collector Structures and Solid Reactants for Secondary Electrochemical Cells". This application is hereby expressly incorporated by reference.

The carbonaceous material and volatile substance are preferably selected to activate at approximately the same temperatures. The volatile should preferably sublimate or thermally decompose at a temperature somewhat below that at which the thermosetting material completely solidifies. However, the thermosetting material should be in at least semisolid state when the volatile transforms to capture the imparted porosity. It can be advantageous to select thermosetting materials, e.g. thermosetting resins, that polymerize and solidify slowly over extended periods of time, e.g. 2 to 24 hours, at temperatures at or slightly above the transformation temperatures of the volatile. Such a combination of these materials permits the smooth development of porosity within the electrode structure without fracture of already solidified resin or splattering of paste as the volatile vaporizes.

In selecting the carbonaceous, thermosetting binding material, a large number of known thermosetting resins appear suitable for use. Polymerization resulting in solidification normally can be effected by curing at temperatures of about 40° to 200° C. For some resins, e.g. furfuryl alcohol, a catalyst is added. A comprehensive listing of such carbonaceous binders is given in *Proceedings of the Fourth Conference on Carbon*, "Synthetic Binders for Carbon and Graphite", by Riesz and Susman, pages 609-623, Pergamon Press, 1960. Selected resins suitable for use in the present application are given in Table I.

TABLE I

| Name and source | Type | Coke residue % |
|---|---|---|
| ARL No. J1254 U.S. Steel Corp. | Coal tar pitch | 52.5 |

TABLE I-continued

| Name and source | Type | Coke residue % |
|---|---|---|
| Durez 7031A (ON 3266) Hooker Electrochemical Co. | Phenol-formaldehyde | 52.1 |
| Durez 16470 RI-3385 Hooker Electrochemical Co. Durez Catalyst 17932 | Liquid furfuryl alcohol polymer | 49.1 |
| Polyacrylonitrile American Cyanamid Co. | Polyacrylonitrile | 44.3 |
| Phenol-benzaldehyde Armour Research Foundation | Phenol-benzaldehyde | 37.3 |
| White rosin powder Fisher Scientific Co. | Natural rosin with diluent | 28.1 |
| Polybutadiene rubber Phillips Petroleum Co. | Polybutadiene rubber | 12.1 |
| LL-1 Hercules Powder Co. | Cellulose acetate | 11.7 |
| Kralastic B U.S. Rubber (Naugatuck) | Butadiene-acrylonitrile and styrene-acrylonitrile blend | 11.6 |
| Cymol 405 American Cyanamid Co. | Melamine-formaldehyde | 10.2 |
| Epon S2S, Diethylene-triamine Cured Shell Chemical Co. | Epoxy resin | 10.1 |
| Agerite D Vanderbilt | Polymerized trimethyl dihydroxyquinoline | 8.0 |
| Cyacor 151 American Cyanamid | Urea formaldehyde | 8.2 |

In Table I, coke residues were determined after carburizing the resin at a temperature of 950° C. for 7 minutes. Those resins having high coke residues are advantageously used in the present application particularly where carburization or graphitization of the matrix is planned to enhance current collection. Those resins found preferable for use in forming low-density active material include phenolformaldehyde, phenol-benzaldehyde, furfuryl alcohol polymer and epoxy resins. Various coal tar pitch binders are also well suited for electrode preparation, but these materials are complex mixtures of indefinite chemical structure and may require close control to provide reproducible electrode material.

The volatile substance employed in the electrode paste is one that will transform directly from the solid to the vapor state. This can occur by such processes as sublimation as in the case of carbon dioxide (dry ice) or decomposition as in the case of ammonium carbonate which decomposes at about 58° C. to form carbon dioxide and ammonia gas. Various volatiles with their transformation temperatures from solid to vapor are given in Table II.

TABLE II

| Volatile | Transformation Temperature, ° C. |
|---|---|
| Ammonium carbonate | 58 |
| Ammonium bicarbonate | 100 |
| Copper acetylacetone | 230 |
| Hexachloroethane | 170 |
| Potassium amide | 400 |
| Ferrous chloride | 670 |

The volatile substance is selected for use with the carbonaceous binder material in mind. The gases produced on decomposition or sublimation of the volatile must be released through the paste or plastic mixture to impart porosity and are preferably released before too rigid a structure is produced that might trap high-pressure gases or result in fracture of the solid electrode structure. Therefore, the volatiles are preferably selected with a transformation to vapor temperature that is less than the temperature which will rapidly result in rigid setting of the carbonaceous binder material. Of those listed in Table II, ammonium carbonate and ammonium bicarbonate are of preference in this regard.

It will be clear, particularly from the examples given in the copending application of Kaun cited above, that the porosity of the carbonaceous material will vary directly with the volume of the volatile. This, of course, is due to the loss of volatile on transformation to vapor.

In most of the resins listed in Table I, particularly furfuryl alcohol, phenol-benzaldehyde and phenol-formaldehyde, a sufficiently plastic or semisolid resin is formed during curing such that volatiles which transform at even higher temperatures than normal curing temperatures can be used to provide a porous substrate. Such thermosetting materials might be selected for use where it is desirable to not only polymerize and cure the resin into a solid structure but also to carburize or to graphitize the resulting porous matrix.

The active electrode materials are incorporated into the paste mixture in solid, particulate form. In the positive electrode, metal chalcogenides, that is sulfides, oxides and selenides, are contemplated. For example, the transition metal sulfides including sulfides of iron, cobalt and nickel as well as the copper sulfides and mixtures of one or more of these compounds have been found to be particularly well suited for high-energy electrochemical cells. These materials are relatively plentiful and remain solid at typical cell operating temperatures of 400° to 550° C. at which typical electrolytic salts contemplated are molten.

In the negative electrode, the active material comprises an alloy of the reactant, e.g. an alkali metal or an alkaline earth metal and a more chemically inert element such as those in Groups IIIA and IVA of the Periodic Table. The alloys are provided in solid particulate form and are selected from those which remain solid at the cell operating temperature. For example, alloys of lithium-aluminum and lithium-silicon, as well as calcium-aluminum, calcium-silicon, calcium-magnesium, and ternary and quaternary alloys including these reactants and inert materials could be employed as active material in the paste mixture.

Various commercially available metal and carbon foams and felts can be employed as the substrate materials. The foamed substrate materials are generally preferred due to the high porosity obtainable within a single, integral structure. Table III lists a number of materials that are suitable for use as the positive or the negative electrode substrates.

TABLE III

| Material | Porosity % Void Volume | Ave. Pore Size microns |
|---|---|---|
| Foams[1] | | |
| Fe | 90–99 | 400–2000 |
| Ni | 90–99 | " |
| Mo | 70–82 | " |
| Cr | 65 | " |
| Nb | 75 | — |
| Vitreous carbon | 90–99 | 200–2400 |
| Graphite | 48–92 | 400–2400 |
| Felts | | |
| Steel wool | | |
| Carbon felt | | |

[1]Many of the metallic foams such as Fe and Ni are commercially available under the trademark Retimet.

A generally flat, sheet-like porous substrate of one of the types illustrated above having a thickness of, for instance, ½ to 2 cm will ordinarily be selected. More than one sheet of a material such as iron or nickel Retimet (a trademark) can be used as stacked layers within a single porous substrate. This type material can be cut slightly oversize respecting its major surface areas in order to form a force fit into a support ring or a porous carbon cup. In some instances, it may be desirable to attach a porous fine cloth or screen across the bottom of the substrate to avoid particle leakage during loading.

The particulate carbonaceous material with embedded active material is comminuted to an average particle size that is somewhat smaller than the average pore size of the selected substrate material. For instance, carbonaceous particles of about 100 to 400 microns might be selected for use with substrates containing about the same to somewhat larger pore sizes.

In loading the particulate carbonaceous material into the substrate, less than about 1 cm thick layers are prepared at a time to minimize any irregular particle size distribution throughout the substrate. The carbonaceous particles are uniformly spread over the exposed surface of the porous substrate and the substrate is vibrated at an effective frequency and amplitude for a sufficient period of time to load the reactant particles into the interstitial openings. Of course, additional particulate material can be added during the loading step.

Various amounts of particulates can be loaded into a substrate depending on the electrode to be prepared. Substrates of 90 to 99% initial porosity are contemplated with sufficient loading of carbonaceous particles to provide a porosity of 20 to 70% prior to filling with electrolyte. In positive electrodes that employ metal chalcogenides such as the iron sulfides, large volume increases may occur on cycling such as from the production of lithium sulfide. It is in such positive electrodes that the particles prepared by the present method can be most advantageously employed. The void volume of porous substrate in these positive electrodes should be filled by only a minor fraction, that is between ¼ and ½ of the void volume, to provide sufficient space for accommodating reaction product. Preferably, 25 to 30 volume percent of the substrate is loaded. By incorporating much of the required void volume within the porous, low-density particles of the present invention, the distribution of active material can be maintained within the electrode. During cell cycling, the low-density particles remain positioned within the substrate to provide sites for recharge of the active material without drift or slumping.

EXAMPLE I

Approximately 40 grams of particulate $FeS_2$ −325 U.S. sieve series (about 44 microns) were blended with about 8 grams of ammonia carbonate of about −45 U.S. sieve series as a volatile and about 12 grams of furfuryl alcohol, a thermosetting carbonaceous material, to form a thick paste. The material was dried overnight at about 100° C. and then baked at about 150° C. for 4 hours. The resultant agglomerates were ground and sieved into three particle size fractions, −45 +100, −100 +200, and −200, U.S. sieve series. These openings correspond to particle sizes of about 150 to 350 microns, 74 to 150 microns and below about 74 microns. The resulting porous particles were then vibratorily loaded into a vitreous carbon substrate having a porosity of about 95% and average pore sizes of about 400 to 1200 microns. The loadings are shown in Table IV below.

TABLE IV

| Particle Size of Starting $FeS_2$ Material (Mesh) U.S. sieve series | Porous Particle Size U.S. sieve series | Volume Percent Loading of $FeS_2$ in Vitreous Carbon |
|---|---|---|
| −325 | −45 + 100 | 26.8 |
| −325 | −100 + 200 | 23.8 |
| −325 | −200 | 27.6 |
| As received | −45 + 100 | 40.0 |
| As received | −100 + 200 | 46.5 |
| −100 + 200 | −45 + 100 | 40.1 |
| −100 + 200 | −100 + 200 | 47.2 |

The loadings as thus obtained and shown in Table IV clearly indicates that the $FeS_2$ agglomerated powder prepared from the −325 mesh material results in a powder which gives the desired level of loading for $FeS_2$.

EXAMPLE II

Low-density active material was prepared as described in Example I with −325 U.S. sieve series $FeS_2$ embedded within porous particles of polymerized furfuryl resin. The low-density particles were vibratorily loaded into a vitreous carbon substrate and assembled within an electrochemical cell opposite to a negative electrode having LiAl alloy as active material. Molten LiCl-KCl eutectic was used as electrolyte. The cell was operated for 5 cycles at 20 to 50 mA/cm².

It will be seen from the foregoing description and example that the present invention provides an improved method for loading a desired quantity of active material into a porous electrically conductive substrate. Through use of this method, the loading can be limited and controlled to an amount that permits volumetric expansion during cycling while allowing initial uniform loading of the substrate.

The embodiments of the invention in which an exclusive property or privilege is claimed are defined as follows:

1. An electrode for use in a secondary electrochemical cell comprising a porous substrate of electrically conductive material having a void volume impregnable by molten electrolyte and having solid particles including active material loosely distributed within the void volume of said substrate as separate and distinct particles, the improvement wherein said solid particles comprise porous carbonaceous particles of cured thermosetting material having embedded therein particles of electrode active material selected from the group of transition metal sulfides consisting of the sulfides of iron, cobalt, nickel and copper.

2. The electrode of claim 1 wherein said porous substrate is of vitreous carbon foam of 90-99% porosity and 400 to 1200 microns pore size.

3. The electrode of claim 1 wherein 25 to 30 volume percent of said porous substrate is loaded with said active material.

4. The electrode of claim 1 wherein said thermosetting material is selected from the group consisting of phenolformaldehyde, phenol-benzaldehyde and furfuryl alcohol.

5. The electrode of claim 1 wherein said porous carbonaceous particles are of a particle size of about 2 to 10 times that of said particles of electrode active material.

6. The electrode of claim 1 wherein said porous carbonaceous particles are of 75 to 350 microns size and include embedded, active material particles of less than about 44 microns size.

* * * * *